United States Patent [19]

Pantone et al.

[11] Patent Number: 5,719,229
[45] Date of Patent: Feb. 17, 1998

[54] PROCESS FOR PREPARING SOLID ELASTOMERIC POLYURETHANES HAVING REDUCED SURFACE SKINNING

[75] Inventors: Richard S. Pantone, New Martinsville, W. Va.; Ashok M. Sarpeshkar, Upper St. Clair, Pa.

[73] Assignee: Bayer Corporation, Pittsburgh, Pa.

[21] Appl. No.: 580,268

[22] Filed: Dec. 28, 1995

[51] Int. Cl.$^6$ .................. C08K 5/07; C08K 5/09; C08K 5/13; C08K 5/21

[52] U.S. Cl. .................. 524/706; 524/710; 524/723; 524/778; 524/736; 524/738; 524/741; 524/742; 524/765; 524/770; 524/773; 524/775; 528/48; 528/49; 528/51; 528/52; 528/53; 528/59; 528/80; 528/83; 528/84

[58] Field of Search .................. 524/706, 710, 524/723, 728, 736, 738, 741, 742, 765, 770, 773, 775; 528/48, 49, 51, 52, 53, 59, 80, 83, 84

[56] References Cited

U.S. PATENT DOCUMENTS

| | | | |
|---|---|---|---|
| 3,635,906 | 1/1972 | Jayawant | 528/58 |
| 3,806,486 | 4/1974 | Endriss et al. | 156/316 |
| 3,883,465 | 5/1975 | Olstowski | 524/773 |
| 3,886,102 | 5/1975 | Olstowski | 524/773 |
| 4,001,165 | 1/1977 | Olstowski | 524/773 |
| 4,401,804 | 8/1983 | Wooten et al. | 528/272 |
| 4,551,498 | 11/1985 | Yeater et al. | 524/461 |
| 4,618,667 | 10/1986 | Kay et al. | 528/49 |

OTHER PUBLICATIONS

A. Awater, "PU cast elastomers" in Polyurethane Handbook, ed. G. Oertel (New York: Hanser Publisher, 1985–month unavailable) pp. 372–388.

J.H. Saunders and K.C. Frisch, "Urethane Elastomers" in Polyurethanes Chemistry and Technology (New York: Interscience Publishers, 1962–month unavailable), pp. 273–314.

*Primary Examiner*—Rabon Sergent
*Attorney, Agent, or Firm*—Joseph C. Gil; Richard E.L. Henderson

[57] ABSTRACT

This invention relates to solid elastomeric polyurethanes prepared by reacting, in an open mold at an isocyanate index of 80 to 120, (a) an isocyanate prepolymer having an isocyanate content of 3 to 15% by weight and a number average molecular weight of 550 to 20,000 prepared by the reaction of (1) organic polyisocyanates having 2 to 3 NCO groups, and (2) isocyanate-reactive polyester polyols having two to three isocyanate-reactive hydroxyl groups and a number average molecular weight of 400 to 10,000 and prepared in the presence of an esterification catalyst, and optionally containing other isocyanate-reactive compounds, wherein the equivalent ratio of isocyanate groups to isocyanate-reactive groups is 1.2:1 to 34:1;

(b) a diol chain extender, optionally in admixture with a crosslinker and/or an amino-containing chain extender and/or crosslinker;

(c) 0.001 to 10% by weight, based on the weight of the isocyanate prepolymer, of a catalyst; and (d) 0.01 to 5% by weight, based on the isocyanate prepolymer, of surface skinning retardants consisting of (1) certain carboxylic acids and derivatives thereof, (2) 1,2-diketones, 1,3-diketones, and aromatic hydroxyketones; (3) mono- and dihydric phenols, (4) N-substituted ureas and thioureas, and/or (5) certain phosphorus compounds.

12 Claims, No Drawings

5,719,229

PROCESS FOR PREPARING SOLID ELASTOMERIC POLYURETHANES HAVING REDUCED SURFACE SKINNING

BACKGROUND OF THE INVENTION

This invention relates to polyurethane elastomers having reduced surface skinning and improved green strength prepared by reaction of polyester-based isocyanate prepolymers with diol chain extenders in the presence of certain surface skinning retardants.

The casting of polyurethane elastomers in open molds is known. E.g., A. Awater, "PU cast elastomers" in *Polyurethane Handbook*, ed. G. Oertel (New York: Hanser Publishers, 1985), pages 372–388; and J. H. Saunders and K. C. Frisch, "Urethane Elastomers" in *Polyurethanes, Chemistry and Technology* (New York: Interscience Publishers, 1962), pages 273–314. However, cast elastomers often exhibit undesirable surface skinning, especially when prepared using polyester-based prepolymers, and poor green strength. For example, surface skinning is often observed when using a polyester staring material that contains residual catalyst (such as known tin or titanium compounds), when using certain dihydroxy silicon-based compounds, and when using certain zinc salts as mold release agents.

Various approaches to eliminate surface skinning and improve green strength have been reported. E.g., U.S. Pat. Nos. 3,806,486, 3,635,906, 4,401,804, 4,551,498, and 4,618,667. However, such methods are either not applicable to polyester-based prepolymers or would adversely affect processing of cast elastomers, for example, by undesirably extending pot life. Consequently, it has not previously been possible to reduce surface skinning and improve green strength when preparing cast elastomers from polyester-based isocyanate prepolymers in the presence of a catalyst.

It has now been found possible to prepare cast elastomeric polyurethanes having reduced surface skinning and improved green strength by adding certain skinning retardants during the preparation or chain extension of polyester-based isocyanate prepolymers in which catalysts are present.

SUMMARY OF THE INVENTION

This invention relates to a process for preparing solid elastomeric polyurethanes comprising reacting, in an open mold at an isocyanate index of about 80 to about 120 (preferably 100 to 106), (a) an isocyanate prepolymer having an isocyanate content of about 3 to about 15% by weight (preferably 4 to 10% by weight) and a number average molecular weight of about 550 to about 20,000 (preferably 800 to 5000), wherein said isocyanate prepolymer is a reaction product of (1) one or more organic polyisocyanates having 2 to 3 (preferably 2) reactive isocyanate groups, and (2) one or more isocyanate-reactive polyester polyols having 2 to 3 (preferably 2) isocyanate-reactive hydroxyl groups and a number average molecular weight of 400 to about 10,000 (preferably 1000 to 4000) and prepared in the presence of an esterification catalyst, optionally in admixture with up to an equal weight of one or more isocyanate-reactive compounds other than said polyester polyols and having a functionality of 2 to 3 (preferably 2) and a number average molecular weight of about 400 to about 10,000 (preferably 1000 to 4000), wherein the equivalent ratio of isocyanate groups of component (a)(1) to isocyanate-reactive groups of component (a)(2) is from about 1.2:1 to about 34:1 (preferably 1.7:1 to 5:1);

(b) a diol chain extender having a molecular weight of 62 to 399 (preferably 62 to 120), optionally in admixture with up to about an equal weight of a crosslinker having 3 to 6 hydroxyl groups and a molecular weight of 90 to 399 and up to about an equal weight of an amino-containing chain extender and/or crosslinker having a molecular weight of from 32 to 399;

(c) about 0.001 to about 10% by weight (preferably 0.001 to 1% by weight), based on the weight of the isocyanate prepolymer, of a catalyst; and (d) about 0.01 to about 5% by weight (preferably 0.05 to 0.5% by weight), based on the isocyanate prepolymer, of one or more surface skinning retardants selected from the group consisting of (1) carboxylic acids and derivatives thereof selected from (i) aliphatic mono- and dicarboxylic acids and hydroxy-substituted derivatives thereof and (ii) aromatic monocarboxylic acids and hydroxy-substituted derivatives and acid halides thereof, (2) 1,2-diketones, 1,3-diketones, and aromatic hydroxyketones;

(3) mono- and dihydric phenols, (4) N-substituted ureas and thioureas, (5) phosphorus compounds selected from phosphite mono, di-, and triesters, phosphonate esters, and aromatic phosphinic acids and esters thereof, and (6) mixtures thereof.

This invention also relates to the solid elastomeric polyurethanes prepared by this process.

DETAILED DESCRIPTION OF THE INVENTION

Suitable isocyanate prepolymers (a) can be prepared by reaction of suitable organic polyisocyanates with a substoichiometric amount of a suitable polyester polyol and optional isocyanate-reactive compounds other than the specified polyester polyols.

Suitable organic polyisocyanates (a)(1) for the preparation of isocyanate prepolymer (a) include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such polyisocyanates include those having the formula

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane-1,3- and -1,4-diisocyanate, and mixtures of these isomers; 1-isocyanato-2-isocyanatomethylcyclopentane; 1-isocyanato-1-methyl-3- and/or -4-isocyanatomethylcyclohexane ("IMCI"); 1,3- and 1,4-bis(isocyanatomethyl)cyclohexane; 1-isocyanato-3,3,5-trimethyl-5-isocyanato-methylcyclohexane ("isophorone diisocyanate" or "IPDI"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI" or "HMDI"), including the t,t-, c,t-, and c,c-isomers thereof; dicyclohexylmethane-2,4'-diisocyanate; methyl or ethyl (S)-2,6-diisocyanatohexanoate ("lysine diisocyanate"); dimeryl diisocyanate; $\alpha,\alpha,\alpha',\alpha'$-tetramethyl-1,3- and/or -1,4-xylylene diisocyanate ("TMXDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above. In general, it is preferred to use readily available polyisocyanates, such as MDI or TDI.

Suitable hydroxyl-containing polyester polyols (a)(2) for the preparation of isocyanate prepolymer (a) include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. Regardless of the specific method of preparation used, the polyester polyols (a)(2) are prepared in the presence of an esterification catalyst. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl) cyclohexane, 2methyl-1,3-propanediol, glycerol, trimethylolpropane, 1,2,6-hexanetriol, 1,2,4-butanetriol, trimethylolethane, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as $\epsilon$-caprolactone, or of hydroxycarboxylic acids, such as $\omega$-hydroxycaproic acid, may also be used. Hydrolyrically stable polyesters are preferably used in order to obtain the greatest benefit relative to the hydrolyric stability of the final product. Preferred polyesters include polyesters obtained from adipic acid or isophthalic acid and straight chained or branched diols, as well as lactone polyesters, preferably those based on caprolactone and diols.

Suitable esterification catalysts include various metal compounds, preferably tin, bismuth, titanium, and zinc compounds, especially the organic metal compounds that are also useful as catalyst (c) in the polyurethane-forming reaction. Suitable tin catalysts include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, tin(II) laurate, and tin(II) chloride, as well as tin(IV) compounds, such as dibutyltin dilaurate, dibutyltin dichloride, dibutyltin diacetate, dibutytin maleate, and dioctyltin diacetate. Suitable bismuth catalysts include bismuth neodecanoate, bismuth versalate, and various bismuth carboxylates known in the art. Suitable titanium catalysts include tetrabutyl titanate. Suitable zinc catalysts include zinc neodecanoate and zinc versalate. Mixed metal salts containing more than one metal (such as carboxylic acid salts containing both zinc and bismuth) are also suitable catalysts. The amount of catalyst is normally not critical but is generally used in a quantity ranging from about 0.001 to about 2% by weight, based on the total quantity of the carboxylate and alcohol reactants.

Isocyanate-reactive compounds that can optionally be used in admixture with polyester polyols (a)(2) include compounds containing at least two isocyanate-reactive hydrogen atoms, such as hydroxyl groups, amino groups, thiol groups, or a combination thereof, the preferred compounds being those containing hydroxyl groups. When used at all, such isocyanate-reactive compounds preferably contain 2 to 3 (preferably 2) hydroxyl groups and have a molecular weight of about 400 to about 10,000 (preferably 1000 to 4000), including for example, hydroxyl-containing polyethers, polyacetals, polycarbonates, polyesterethers, polyester carbonates, polythioethers, polyamides, polyesteramides, polysiloxanes, polybutadienes, and polyacetones, and can optionally contain one or more isocyanate-reactive amino groups. Particularly preferred hydroxyl-containing compounds include polyethers having 2 to 3 (preferably 2) isocyanate-reactive hydroxyl groups. It is also possible, although generally less preferred, to include a portion of a chain extender and/or crosslinker (such as those described below for component (b)) when preparing isocyanate prepolymers (a).

Suitable hydroxyl-containing polyethers are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate (German Auslegeschriften 1,694,080, 1,915,908, and 2,221,751; German Offenlegungsschrift 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio mixed ethers, polythioether esters, or polythioether ester amides, depending on the components used.

Suitable polyesteramides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights range from about 400 to about 10,000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula $-O-Si(R)_3$ in which R denotes a $C_1-C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

General discussions of representative hydroxyl-containing compounds that may be used according to the present invention can be found, for example, in *Polyurethanes, Chemistry and Technology*, edited by Saunders and Frisch, Interscience Publishers, New York, London, Volume I, 1962, pages 32–42 and pages 44–54, and Volume II, 1964, pages 5–6 and 198–199, and in *Kunststoff-Handbuch*. Volume VII, edited by Vieweg and Höchtlen, Carl-Hanser-Verlag, Munich, 1966, on pages 45–71.

The much less preferred isocyanate-reactive amino compounds that can optionally be used in admixture with polyester polyols (a)(2) include the so-called amine-terminated polyethers containing isocyanate-reactive primary or secondary amino groups prepared in known manner.

Suitable diol chain extenders (b) include compounds having two isocyanate-reactive hydrogen atoms and a molecular weight of from 62 to 399. Examples of suitable diol chain extenders include glycols such as 1,2-ethanediol, 1,2- and 1,3-propylene glycol, 1,4- and 2,3-butylene glycol, 1,6-hexanediol, 1,8-octanediol, neopentyl glycol, cyclohexane-dimethanol, 1-methyl-1,3-propanediol, and 2-methyl-1,3-propanediol.

It is also possible, but generally less preferred to include a crosslinker having 3 to 6 hydroxyl groups and a molecular weight of 92 to 399 in amounts up to the weight of diol chain extender (b) used. Examples of suitable crosslinkers include triols, tetraols, and other multifunctional polyols such as glycerol, trimethylolpropane, 1,2,6-hexanetriol, 1,2,4-butanetriol, and trimethylolethane.

It is also possible to include an amino-containing chain extender and/or crosslinker having a molecular weight of from 32 to 399 in amounts up to the weight of diol chain extender (b) used. Examples of suitable such amino-containing compounds include amino alcohols such as ethanolamine, diethanolamine, N-methylethanolamine, N-ethylethanolamine, N-methyldiethanolamine, and N-ethyldiethanolamine.

Suitable catalysts (c) include organic metal compounds, especially organic tin, bismuth, titanium, and zinc compounds. Suitable organic tin catalysts include those containing sulfur, such as dioctyl tin mercaptide, and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth catalysts include bismuth neodecanoate, bismuth versalate, and various bismuth carboxylates known in the art. Suitable titanium catalysts include tetrabutyl titanate. Suitable zinc catalysts include zinc neodecanoate and zinc versalate. Mixed metal salts containing more than one metal (such as carboxylic acid salts containing both zinc and bismuth) are also suitable catalysts.

Other suitable, but generally less preferred, catalysts useful as component (c) include tertiary amines such as triethylamine, tributylamine, N-methylmorpholine, N-ethylmorpholine, N,N,N',N'-tetramethylethylene diamine, pentamethyldiethylene triamine, and higher homologs (German Offenlegungsschriften 2,624,527 and 2,624,528), 1,4-diazabicyclo[2.2.2]octane, N-methyl-N'-(dimethylaminoethyl)piperazine, bis-(dimethylaminoalkyl) piperazines (German Offenlegungsschrift 2,636,787), N,N-dimethylbenzylamine, N,N-dimethylcyclohexylamine, N,N-diethylbenzylamine, bis(N, N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift 1,720,633), bis(dialkylamino) alkyl ethers (U.S. Pat. No. 3,330,782, German Auslegeschrift 030,558, and German Offenlegungsschriften 1,804, 361 and 2,618,280), and tertiary amines containing amide groups (preferably formamide groups) according to German Offenlegungsschriften 2,523,633 and 2,732,292. The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines according to German Offenlegungsschrift 2,732,292.

Sila-amines containing carbon-silicon bonds may also be used as catalysts, for example, those described in German Patentschrift 1,229,290 (corresponding to U.S. Pat. No. 3,620,984). Examples of suitable sila-amines include 2,2,4-trimethyl-2-silamorpholine and 1,3-dimethylaminomethyl tetramethyldisiloxane.

Suitable catalysts also include nitrogen-containing bases, such as tetraalkylammonium hydroxides; alkali metal hydroxides, such as sodium hydroxide; alkali metal phenolates, such as sodium phenolate; and alkali metal alcoholates, such as sodium methoxide. Hexahydrotriazines (German Offenlegungsschrift 1,709,043) and tertiary amines containing amide groups (preferably formamide groups) (German Offenlegungsschriften 2,523,633 and 2,732,292) may also be used as catalysts. Known Mannich bases of secondary amines (such as dimethylamine) and aldehydes (preferably formaldehyde) or ketones (such as acetone) and phenols may also be used as catalysts.

Suitable catalysts also include delayed action catalysts, which are modified versions of known catalysts, such as modified tin-based catalysts or acid-blocked (i.e., N-protonated) amine catalysts formed from known tertiary amine catalysts and carboxylic or phenolic acids (e.g., U.S. Pat. No. 5,071,613), and can be obtained from a number of commercial sources. Examples of delayed action catalysts include TOPCAT 170, TOPCAT 190, and TOPCAT 290 tin-based catalysts (available from Tylo Industries, Parsippany, N.J.), DABCO 8154 and DABCO BL-17 catalysts based on 1,4-diazabicyclo[2.2.2]octane (available from Air Products and Chemicals, Inc., Allentown, Pa.), and POLYCAT SA-1, POLYCAT SA-102, and POLYCAT SA-610/50 catalysts based on POLYCAT DBU amine catalyst (available from Air Products and Chemicals, Inc.).

Any of the above-mentioned catalysts may, of course, be used as mixtures.

Further representatives of catalysts to be used according to the invention and details concerning their mode of action are described in Kunststoff Handbuch, Volume VII, published by Vieweg and Höchtlen, Carl Hanser Verlag, Munich, 1966, for example, on pages 96 to 102.

Although catalyst (c) can be added at almost any point before reaction of the isocyanate prepolymer (a) with isocyanate-reactive component (b), it has been found particularly advantageous to add the catalyst to polyester component (a)(2) before or during the preparation of prepolymer (a). Regardless of how added, catalyst (c) is generally used in a quantity ranging from about 0.001 to about 10% by weight, based on the quantity of isocyanate prepolymer (a).

Surface skinning retardants (d) are compounds found to retard the formation of surface skinning on cast-molded polyurethanes. Suitable surface skinning retardants that can be used according to the invention include the following groups of compounds:

(1) Carboxylic acids and derivatives thereof selected from aliphatic mono- and dicarboxylic acids and hydroxy-substituted derivatives thereof and aromatic monocarboxylic acids and hydroxy-substituted derivatives (i.e, phenols) and acid halides (especially chlorides) thereof. Examples of suitable carboxylic acids and derivatives include stearic acid, adipic acid, tartaric acid, benzoic acid, salicylic acid (also a phenol), p-hydroxybenzoic acid (also a phenol), benzoyl chloride, and p-nitrobenzoyl chloride. Tricarboxylic acids such as citric acid and aromatic dicarboxylic acids such as phthalic acid (and its acid anhydride) are generally not suitable.

(2) Diketones in which the carbonyl groups are adjacent (i.e., 1,2-diketones) or separated by one intervening carbon atom (i.e., 1,3-diketones), as well as aromatic hydroxyketones such as benzoin. Examples of suitable 1,2- and 1,3-diketones and hydroxyketones include 2,3-butanedione, 2,4-pentanedione, benzil, dibenzoylmethane, and benzoin.

(3) Mono- and dihydric phenols (preferably those substituted in the aromatic ring with lower alkyl groups), including heteroaromatic phenols. Examples of suitable phenols include 2,6-di-tert-butyl-p-cresol (also known as butylated hydroxytoluene, or "BHT"), t-butyl-catechol, 8-hydroxyquinoline, salicylic acid (also an aromatic carboxylic acid), and p-hydroxybenzoic acid (also an aromatic carboxylic acid).

(4) N-Substituted ureas (preferably those in which the substituent is one or more lower alkyl groups) and thioureas.

Examples of suitable N-substituted ureas include N-methylurea, N,N'-dimethylurea, 1,1,3,3-tetramethylurea, and N,N'-dimethylcarbanilide. Examples of suitable thioureas include thiourea, 1,3-dibutyl-2-thiourea, and 1,3-diphenyl-2-thiourea.

(5) Phosphorus compounds selected from phosphite mono, di-, and triesters (preferably lower alkyl di- and triesters), phosphonate esters (preferably alkylphosphonate alkyl esters), and aromatic phosphinic acids and esters thereof. Examples of suitable phosphorus compounds include diethyl phosphite, trimethyl phosphite, dimethyl methylphosphonate, and phenylphosphinic acid. Phosphoric acid, phosphorous acid, and their esters are generally not suitable.

Suitable surface skinning retardants can often have more than one of the functionalities described above. Compounds that bear substantially inert substituents on chain or ring carbon atoms can also generally be used without significantly affecting their effectiveness.

The surface skinning retardants (d) can be added at essentially any point in the process of the invention. For example, the retardants can be added to the polyester starting materials, to any component during preparation of the isocyanate prepolymer, to the isocyanate prepolymer after it is prepared, or to the diol chain extender.

Various additives known for use in the preparation of polyurethanes can optionally also be used in the process of the invention. Suitable additives may include, for example, internal mold release agents, blowing agents, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31. When used, the preferred auxiliary agents and additives include known fillers and/or reinforcing substances, such as barium sulfate, calcium carbonate, talc, hydrated alumina, clay, kieselguhr, whiting, mica, and especially glass fibers, liquid crystal fibers, glass flakes, inorganic or organic microspheres, aramide fibers, nylon fibers, and carbon fibers. These fillers and/or reinforcing materials may be added in quantities of up to 80% by weight (preferably up to 30% by weight) based on the total quantity of filled or reinforced product.

The process of the invention is carried out using the prepolymer process, in which isocyanate prepolymer (a) that is formed by reacting organic polyisocyanate (a)(1) with polyester polyol component (a)(2), which may optionally contain smaller amounts of isocyanate-reactive compounds other than the polyester and typically includes the catalyst. The isocyanate prepolymer is mixed with the chain extender/crosslinker component (b) and surface skinning retardants (d), as well as any optional additives, and allowed to react in a suitable open mold. When carrying out the process of the present invention, the quantity of polyisocyanate prepolymer should preferably be such that the isocyanate index is from about 80 to about 120, preferably 100 to 106. By "isocyanate index" is meant the quotient of the number of isocyanate groups divided by the number of isocyanate-reactive groups, multiplied by 100.

The in-mold reaction is generally carried out in heated mold at a temperature of about 80° C. to about 130° C. (preferably 90° C. to 110° C.). After the polymer-forming reaction is complete, the resultant elastomers are post-cured, typically at a temperature of about 90° C. to about 120° C.

The elastomeric polyurethanes prepared according to the present invention can be used in cast elastomer applications known in the art where good static and dynamic properties are required, such as in solid tires, gaskets, belting, casters, and the like.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

(comparison)

Comparison Example 1 was carried out in the absence of an additive according to the invention.

A 2500 g portion of a polybutylene adipate polyester prepared in the presence of stannous chloride catalyst and having a molecular weight of 2000 was added at a temperature 80° C. over a period of 15 minutes to 1357 g of diphenylmethane diisocyanate containing 98 percent by weight of the 4,4'-isomer and 2 percent by weight of the 2,4'-isomer that had previously been heated to a temperature of 50° C. The mixture was then maintained at 80° C. for two hours under dry nitrogen. The resultant prepolymer was degassed at 2 mm Hg pressure and 80° C. for one hour. By analysis, the prepolymer contained 9.1% NCO. To a 300 g portion of this prepolymer at 80° C. was added 28.3 g of 1,4-butanediol at 25° C. After being mixed for 30 seconds, the resultant product was cast into the cavity (measuring about 15 cm×15 cm×3 cm) of an open-faced carbon steel mold (heated at 115° C. on a thermostatically-controlled electric hot plate) and allowed to react for 30 minutes before being removed from the mold. Upon removal from the mold, the elastomer exhibited a significant amount of surface skinning (that is, skinning over more than 80% of the surface area of the molded product).

Example 2

Example 2 was carried out by adding an additive according to the invention to the prepolymer intermediate before preparing the polyurethane product.

A 2500 g portion of a polybutylene adipate polyester prepared in the presence of stannous chloride catalyst and having a molecular weight of 2000 was added at a temperature 80° C. over a period of 15 minutes to 1357 g of diphenylmethane diisocyanate containing 98 percent by weight of the 4,4'-isomer and 2 percent by weight of the 2,4'-isomer that had previously been heated to a temperature of 50° C. The mixture was then maintained at 80° C. for two hours under dry nitrogen. The resultant prepolymer was degassed at 2 mm Hg pressure and 80° C. for one hour. By analysis, the prepolymer contained 9.1% NCO. To a 300 g portion of this prepolymer at 80° C. was added 0.3 g of salicylic acid and the mixture was mixed at 80° C. under 2 mm Hg of vacuum for 15 minutes. To this mixture was then added 28.3 g of 1,4-butanediol at 25° C. After being mixed for 30 seconds, the resultant product was cast into the cavity (measuring about 15 cm×15 cm×3 cm) of an open-faced carbon steel mold (heated at 115° C. on a thermostatically-controlled electric hot plate) and allowed to react for 30 minutes before being removed from the mold. Upon removal from the mold, the elastomer exhibited no surface skinning.

Example 3

Example 3 carried out by adding an additive according to the invention to the polyester precursor before preparing the prepolymer intermediate.

To a 2500 g portion of a polybutylene adipate polyester prepared in the presence of stannous chloride catalyst and having a molecular weight of 2000 was added with stirring at a temperature 80° C. over a period of one hour 3.86 g of salicylic acid. To this mixture was added at a temperature 80° C. over a period of 15 minutes to 1357 g of diphenylmethane diisocyanate containing 98 percent by weight of the 4,4'-isomer and 2 percent by weight of the 2,4'-isomer that had previously been heated to a temperature of 50° C. The mixture was then maintained at 80° C. for two hours under dry nitrogen. The resultant prepolymer was degassed at 2 mm Hg pressure and 80° C. for one hour. By analysis, the prepolymer contained 9.1% NCO. To a 300 g portion of this prepolymer at 80° C. was added 28.3 g of 1,4-butanediol at 25° C. After being mixed for 30 seconds, the resultant product was cast into the cavity (measuring about 15 cm×15 cm×3 cm) of an open-faced carbon steel mold (heated at 115° C. on a thermostatically-controlled electric hot plate) and allowed to react for 30 minutes before being removed from the mold. Upon removal from the mold, the elastomer exhibited no surface skinning.

Example 4

Example 4 carried out by adding an additive according to the invention during preparation of the prepolymer intermediate.

A 2500 g portion of a polybutylene adipate polyester prepared in the presence of stannous chloride catalyst and having a molecular weight of 2000 was added at a temperature 80° C. over a period of 15 minutes to 1357 g of diphenylmethane diisocyanate containing 98 percent by weight of the 4,4'-isomer and 2 percent by weight of the 2,4'-isomer that had previously been heated to a temperature of 50° C., after which was added 3.86 g of 1,3-diphenyl-2-thiourea. The mixture was then maintained at 80° C. for two hours under dry nitrogen. The resultant prepolymer was degassed at 2 mm Hg pressure and 80° C. for one hour. By analysis, the prepolymer contained 9.0% NCO. To this mixture was then added 28.3 g of 1,4-butanediol at 25° C. After being mixed for 30 seconds, the resultant product was cast into the cavity (measuring about 15 cm×15 cm×3 cm) of an open-faced carbon steel mold (heated at 115° C. on a thermostatically-controlled electric hot plate) and allowed to react for 30 minutes before being removed from the mold. Upon removal from the mold, the elastomer exhibited no surface skinning.

Examples 5–130

The methods of Examples 1–4 were repeated using the variations shown in the following tables. The following starting materials were used in these examples:

Polyester polyols

| Polyester A | A polyethylene adipate having a number average molecular weight of about 2000 |
| Polyester B | A polyethylene/butylene adipate (1:1 ethylene/butylene ratio) having a number average molecular weight of about 2000 |
| Polyester C | A polybutylene adipate having a number average molecular weight of about 2000 |

Surface skinning retardants

| Retarder a | Stearic acid |
| Retarder b | Adipic acid |
| Retarder c | Tartaric acid |
| Retarder d | Benzoic acid |
| Retarder e | Salicylic acid |
| Retarder f | p-Hydroxybenzoic acid |
| Retarder g | Benzoyl chloride |
| Retarder h | p-Nitrobenzoyl chloride |
| Retarder i | 2,3-Butanedione |
| Retarder j | Benzil |
| Retarder k | Benzoin |
| Retarder l | 2,4-Pentanedione |
| Retarder m | Dibenzoylmethane |
| Retarder n | 2,6-bi-tert-butyl-p-cresol ("BHT") |
| Retarder o | 8-Hydroxyquinoline |
| Retarder p | t-Butyl catechol |
| Retarder q | Thiourea |
| Retarder r | 1,3-Dibutylthiourea |
| Retarder s | 1,3-Diphenyl-2-thiourea |
| Retarder t | N-Methylurea |
| Retarder u | N,N'-Dimethylurea |
| Retarder v | 1,1,3,3-Tetramethylurea |
| Retarder w | N,N'-Dimethylcarbanilide |
| Retarder x | Diethyl phosphite |
| Retarder y | Trimethyl phosphite |
| Retarder z | Dimethyl methylphosphonate |
| Retarder aa | Phenylphosphinic acid |

Comparison compounds for surface skinning retardants

| Comparison 1 | Citric acid |
| Comparison 2 | Phthalic acid |
| Comparison 3 | Phthalic anhydride |
| Comparison 4 | 2-Hydroxyacetophenone |
| Comparison 5 | Dimethylglyoxime |
| Comparison 6 | Urea |
| Comparison 7 | Phenylurea |
| Comparison 8 | N,N'-Di-o-tolylurea |
| Comparison 9 | Dimethyl urea of dicyclohexylmethane-4,4'-diisocyanate |
| Comparison 10 | Dicyanodiamide |
| Comparison 11 | Phosphoric acid |
| Comparison 12 | Phosphorous acid |
| Comparison 13 | Trimethyl phosphate |
| Comparison 14 | Triethyl phosphate |
| Comparison 15 | Phenothiazine |
| Comparison 16 | Bis(3,5-di-tert-butyl-4-hydroxyhydrocinnamamide) (available as IRGONOX MD-1024 from Ciba-Geigy) |
| Comparison 17 | A hydroxyalkyl-terminated polydimethyl siloxane having a molecular weight of 600 (available as BAYSILONE OF OH 502 from Bayer Corporation) |
| Comparison 18 | A polytetramethylene ether glycol having a molecular weight of 2000 (available as POLYMEG 2000 from QO Chemicals) |

Examples 5–16

Examples 5–16 were carried out by the general method of Example 1 to show the effect of catalyst on surface skinning. Results are shown in Table 1. Although polyurethane elastomers prepared in the absence of catalyst exhibit little or no surface skinning, the presence of catalyst but no skinning retardant leads to significant surface skinning.

TABLE 1

Polyurethane elastomers prepared in the absence of a surface skinning retardant and in the presence or absence of catalyst

| | | Prepolymer parameters | | |
|---|---|---|---|---|
| Example | Polyester | Catalyst present? | NCO content (%) | Skinning evaluation[1] |
| 1 | A | No | 6.6 | Good |
| 2 | A | No | 9.0 | Good |
| 3 | A | Yes | 8.8 | Poor |
| 4 | A | Yes | 9.1 | Poor |
| 5 | B | No | 8.9 | Good |
| 6 | B | No | 9.0 | Good* |
| 7 | B | No | 9.1 | Good |
| 8 | B | Yes | 8.9 | Poor* |
| 9 | B | Yes | 9.0 | Poor |
| 10 | B | Yes | 9.1 | Poor |
| 11 | C | No | 9.0 | Good |
| 12 | C | Yes | 8.8 | Poor* |
| 13 | C | Yes | 8.9 | Poor* |
| 14 | C | Yes | 9.0 | Poor* |

TABLE 1-continued

Polyurethane elastomers prepared in the absence of a surface skinning retardant and in the presence or absence of catalyst

| | | Prepolymer parameters | | |
|---|---|---|---|---|
| Example | Polyester | Catalyst present? | NCO content (%) | Skinning evaluation[1] |
| 15 | C | Yes | 9.1 | Poor* |
| 16 | C | Yes | 9.2 | Poor* |

[1]Surface skinning evaluations were rated as good if no skinning is observed and poor if extreme skinning is occurs. Asterisk (*) indicates repeated experiments that produced the same results.

Examples 17–88

Examples 17–88 were carded out by the method of Example 2 to evaluate the effect of adding surface skinning retardants of various types and quantities to the prepolymer intermediates. Results are shown in Table 2.

TABLE 2

Polyurethane elastomers prepared in the presence of a surface skinning retardant added to the prepolymer

| | | Prepolymer parameters | | Surface skinning retardant | | |
|---|---|---|---|---|---|---|
| Example | Polyester | Catalyst present? | NCO content (%) | Retardant | Quantity relative to prepolymer (%) | Skinning evaluation[1] |
| 17 | A | No | 6.6 | e | 0.10 | Good |
| 18 | A | No | 6.6 | e | 0.20 | Good |
| 19 | A | Yes | 6.7 | e | 0.10 | Good |
| 20 | A | Yes | 6.7 | e | 0.20 | Good |
| 21 | A | Yes | 8.8 | s | 0.20 | Good |
| 22 | B | No | 8.9 | e | 0.10 | Good |
| 23 | B | No | 8.9 | e | 0.20 | Good |
| 24 | B | No | 9.0 | e | 0.10 | Good |
| 25 | B | No | 9.0 | s | 0.10 | Good |
| 26 | B | Yes | 8.9 | e | 0.10 | Good |
| 27 | B | Yes | 8.9 | e | 0.20 | Good |
| 28 | B | Yes | 9.0 | e | 0.10 | Good |
| 29 | B | Yes | 9.0 | e | 0.20 | Good |
| 30 | B | Yes | 9.0 | s | 0.10 | Good |
| 31 | B | Yes | 9.0 | s | 0.15 | Good |
| 32 | C | Yes | 8.8 | a | 0.10 | Fair |
| 33 | C | Yes | 8.9 | b | 0.10 | Good |
| 34 | C | Yes | 8.8 | c | 0.10 | Fair |
| 35 | C | Yes | 8.9 | c | 0.20 | Fair–good |
| 36 | C | Yes | 8.9 | d | 0.10 | Good |
| 37 | C | Yes | 8.8 | e | 0.10 | Good |
| 38 | C | Yes | 8.8 | e | 0.15 | Good* |
| 39 | C | Yes | 8.8 | e | 0.20 | Good |
| 40 | C | Yes | 8.9 | e | 0.01 | Poor |
| 41 | C | Yes | 8.9 | e | 0.10 | Good |
| 42 | C | Yes | 8.9 | e | 0.17 | Good |
| 43 | C | Yes | 9.0 | e | 0.10 | Good |
| 44 | C | Yes | 9.0 | e | 0.20 | Good |
| 45 | C | Yes | 9.1 | e | 0.10 | Good |
| 46 | C | Yes | 9.1 | e | 0.20 | Fair–good |
| 47 | C | Yes | 9.1 | e | 0.25 | Good |
| 48 | C | Yes | 8.8 | f | 0.10 | Good |
| 49 | C | Yes | 8.9 | g | 0.10 | Fair–good |
| 50 | C | Yes | 8.8 | h | 0.10 | Fair–good |
| 51 | C | Yes | 9.0 | i | 0.20 | Good |
| 52 | C | Yes | 9.0 | j | 0.20 | Fair–good |
| 53 | C | Yes | 8.9 | k | 0.01 | Poor |
| 54 | C | Yes | 8.9 | k | 0.10 | Poor |
| 55 | C | Yes | 9.0 | k | 0.20 | Fair–good |
| 56 | C | Yes | 8.9 | l | 0.01 | Poor |

TABLE 2-continued

Polyurethane elastomers prepared in the presence of a surface skinning retardant added to the prepolymer

| | Prepolymer parameters | | | Surface skinning retardant | | |
|---|---|---|---|---|---|---|
| Example | Polyester | Catalyst present? | NCO content (%) | Retardant | Quantity relative to prepolymer (%) | Skinning evaluation[1] |
| 57 | C | Yes | 8.9 | l | 0.10 | Poor |
| 58 | C | Yes | 8.9 | l | 0.17 | Good |
| 59 | C | Yes | 9.2 | m | 0.20 | Good |
| 60 | C | Yes | 9.0 | n | 0.20 | Fair–good |
| 61 | C | Yes | 9.2 | o | 0.01 | Good |
| 62 | C | Yes | 9.2 | o | 0.02 | Good |
| 63 | C | Yes | 9.2 | o | 0.05 | Good |
| 64 | C | Yes | 9.2 | o | 0.10 | Good* |
| 65 | C | Yes | 8.9 | o | 0.17 | Good |
| 66 | C | Yes | 8.8 | p | 0.10 | Fair–good |
| 67 | C | Yes | 9.0 | q | 0.20 | Fair–good |
| 68 | C | Yes | 8.8 | r | 0.10 | Good |
| 69 | C | Yes | 8.8 | s | 0.01 | Poor |
| 70 | C | Yes | 8.8 | s | 0.10 | Good* |
| 71 | C | Yes | 9.1 | s | 0.15 | Good |
| 72 | C | Yes | 9.2 | s | 0.15 | Good |
| 73 | C | Yes | 8.9 | t | 0.10 | Poor |
| 74 | C | Yes | 9.0 | t | 0.20 | Fair–good |
| 75 | C | Yes | 9.0 | u | 0.20 | Fair–good |
| 76 | C | Yes | 8.9 | v | 0.10 | Good |
| 77 | C | Yes | 8.9 | w | 0.10 | Poor |
| 78 | C | Yes | 9.0 | w | 0.20 | Poor |
| 79 | C | Yes | 9.2 | w | 0.20 | Poor |
| 80 | C | Yes | 9.2 | w | 0.50 | Fair–good |
| 81 | C | Yes | 8.9 | x | 0.10 | Good |
| 82 | C | Yes | 8.9 | y | 0.10 | Good |
| 83 | C | Yes | 8.9 | z | 0.01 | Poor |
| 84 | C | Yes | 8.9 | z | 0.10 | Good |
| 85 | C | Yes | 8.9 | aa | 0.01 | Good |
| 86 | C | Yes | 9.2 | aa | 0.01 | Good |
| 87 | C | Yes | 9.2 | aa | 0.05 | Good |
| 88 | C | Yes | 9.2 | aa | 0.10 | Good |

*[1]Surface skinning evaluations were rated as good if no skinning is observed and poor if extreme skinning is occurs. Asterisk (*) indicates repeated experiments that produced the same results.

Examples 89–111

(comparison)

Comparison Examples 89–111 were carried out by the method of Example 2 to evaluate the effect of adding compounds that do not act as surface skinning retardants to the prepolymer intermediates. Results are shown in Table 3.

TABLE 3

Polyurethane elastomers prepared in the presence of comparison compounds that do not act as surface skinning retardants added to the prepolymer intermediate

| | Prepolymer parameters | | | Comparison compounds | | |
|---|---|---|---|---|---|---|
| Example | Polyester | Catalyst present? | NCO content (%) | Compound | Quantity relative to prepolymer (%) | Skinning evaluation[1] |
| 89 | C | Yes | 9.0 | 1 | 0.20 | Poor |
| 90 | C | Yes | 9.0 | 2 | 0.20 | Poor |
| 91 | C | Yes | 9.2 | 2 | 0.20 | Poor |
| 92 | C | Yes | 8.9 | 3 | 0.10 | Poor |
| 93 | C | Yes | 9.0 | 3 | 0.20 | Poor |
| 94 | C | Yes | 9.2 | 3 | 0.20 | Poor |
| 95 | C | Yes | 8.8 | 4 | 0.10 | Poor |
| 96 | C | Yes | 9.0 | 4 | 0.20 | Poor |
| 97 | C | Yes | 8.8 | 5 | 0.10 | Poor |
| 98 | C | Yes | 9.0 | 6 | 0.20 | Poor |
| 99 | C | Yes | 9.2 | 7 | 0.20 | Poor |
| 100 | C | Yes | 9.2 | 8 | 0.20 | Poor |

TABLE 3-continued

Polyurethane elastomers prepared in the presence of comparison compounds that do not act as surface skinning retardants added to the prepolymer intermediate

| | Prepolymer parameters | | | Comparison compounds | | |
|---|---|---|---|---|---|---|
| Example | Polyester | Catalyst present? | NCO content (%) | Compound | Quantity relative to prepolymer (%) | Skinning evaluation[1] |
| 101 | C | Yes | 9.0 | 9 | 0.10 | Poor |
| 102 | C | Yes | 9.0 | 10 | 0.10 | Poor |
| 103 | C | Yes | 9.0 | 11 | 0.20 | Poor |
| 104 | C | Yes | 9.0 | 12 | 0.20 | Poor |
| 105 | C | Yes | 8.9 | 13 | 0.10 | Poor |
| 106 | C | Yes | 8.9 | 14 | 0.10 | Poor |
| 107 | C | Yes | 8.9 | 15 | 0.10 | Poor |
| 108 | C | Yes | 9.2 | 16 | 0.10 | Poor |
| 109 | C | Yes | 9.0 | 16 | 0.20 | Poor |
| 110 | C | Yes | 9.2 | 16 | 0.50 | Poor |
| 111 | C | Yes | 9.0 | 17 | 0.10 | Poor |

Examples 112–118

Examples 112–118 were carried out by the method of Example 3 to evaluate the effect of adding salicylic acid and a comparison compound that does not act as a surface skinning retardant to the polyester precursor. Results are shown in Table 4.

TABLE 4

Polyurethane elastomers prepared in the presence of a surface skinning retardant or a comparison compound added to the polyester precursor

| | Prepolymer parameters | | | Retardant/comparison compounds | | | |
|---|---|---|---|---|---|---|---|
| Example | Polyester | Catalyst present? | NCO content (%) | Retardant | Comparison | Quantity relative to prepolymer (%) | Skinning evaluation[1] |
| 112 | A | Yes | 8.8 | e | — | 0.15 | Good |
| 113 | B | Yes | 8.9 | e | — | 0.10 | Good |
| 114 | B | Yes | 8.9 | e | — | 0.20 | Good |
| 115 | C | Yes | 9.1 | e | — | 0.10 | Good* |
| 116 | C | Yes | 9.2 | e | — | 0.20 | Good |
| 117 | C | Yes | 8.8 | — | 18 | 1.00 | Poor |
| 118 | C | Yes | 9.2 | — | 18 | 1.00 | Poor |

[1]Surface skinning evaluations were rated as good if no skinning is observed and poor if extreme skinning is occurs. Asterisk (*) indicates repeated experiments that produced the same results.

Examples 119–121

Examples 119–121 were carried out by the method of Example 4 to evaluate the effect of adding 1,3-diphenyl-2-thiourea and a comparison compound that does not act as a surface skinning retardant during preparation of the prepolymer intermediate. Results are shown in Table 5.

TABLE 5

Polyurethane elastomers prepared in the presence of a surface skinning retardant or a comparison compound added to the polyester precursor

| | Prepolymer parameters | | | Retardant/comparison compounds | | | |
|---|---|---|---|---|---|---|---|
| Example | Polyester | Catalyst present? | NCO content (%) | Retardant | Comparison | Quantity relative to prepolymer (%) | Skinning evaluation[1] |
| 119 | A | Yes | 9.2 | — | 16 | 0.02 | Poor |
| 120 | B | Yes | 9.0 | e | — | 0.10 | Good |
| 121 | C | Yes | 9.2 | — | 16 | 0.02 | Poor |

[1]Surface skinning evaluations were rated as good if no skinning is observed and poor if extreme skinning is occurs.

Examples 122–130

Examples 122–130 were carried out by the method of Example 2 to evaluate the effect on thermal stability (as indicated by changes in NCO content and viscosity at 80° C.) and physical properties of adding salicylic acid to the prepolymer intermediates prepared from polyester polyols A, B, and C. Thermal stability results are shown in Table 6 and physical properties are shown in Table 7. No significant changes in prepolymer properties were observed when the treated prepolymers were aged by heating at 80° C. for three days. Furthermore, when the prepolymers were chain-extended with 1,4-butanediol, their elastomer properties were found to compare favorably with untreated elastomers.

TABLE 6

Thermal stability of treated and untreated elastomers

| Example | Polyester | Salicylic acid (%) | Days at 80° C. | NCO content of prepolymer (%) | Viscosity (mPa · s) |
|---|---|---|---|---|---|
| 122 (comp.) | A | 0 | 0 | 6.68 | 2120 |
| | | | 1 | 6.66 | 1760 |
| | | | 2 | 6.61 | 1820 |
| | | | 3 | 6.43 | 1880 |
| 123 | A | 0.1 | 0 | 6.72 | 2220 |
| | | | 1 | 6.63 | 2120 |
| | | | 2 | 6.59 | 1980 |
| | | | 3 | 6.43 | 2020 |
| 124 | A | 0.2 | 0 | 6.7 | 2080 |
| | | | 1 | 6.61 | 2000 |
| | | | 2 | 6.54 | 2120 |
| | | | 3 | 6.46 | 2200 |
| 125 (comp.) | B | 0 | 0 | 8.91 | — |
| | | | 1 | 8.83 | 1240 |
| | | | 2 | 8.62 | 1300 |
| | | | 3 | 8.56 | 1260 |
| 126 | B | 0.1 | 0 | 8.91 | — |
| | | | 1 | 8.89 | 1200 |
| | | | 2 | 8.7 | 1320 |
| | | | 3 | 8.53 | 1320 |
| 127 | B | 0.2 | 0 | 8.91 | — |
| | | | 1 | 8.85 | 1140 |
| | | | 2 | 8.61 | 1320 |
| | | | 3 | 8.66 | 1220 |
| 128 (comp.) | C | 0 | 0 | 9 | 1760 |
| | | | 1 | 8.92 | 1660 |
| | | | 2 | 8.86 | 1720 |
| | | | 3 | 8.68 | 1720 |
| 129 | C | 0.1 | 0 | 9 | 1660 |
| | | | 1 | 8.88 | 1740 |
| | | | 2 | 8.84 | 1760 |
| | | | 3 | 8.67 | 1800 |
| 130 | C | 0.2 | 0 | 9.02 | 1760 |
| | | | 1 | 8.84 | 1680 |
| | | | 2 | 8.82 | 1780 |
| | | | 3 | 8.7 | 1840 |

TABLE 7

Physical properties of treated and untreated elastomers

| | Example | | | | | | | | |
|---|---|---|---|---|---|---|---|---|---|
| | 122 | 123 | 124 | 125 | 126 | 127 | 128 | 129 | 130 |
| Polyester | A | A | A | B | B | B | C | C | C |
| Salicylic acid (%) | 0 | 0.1 | 0.2 | 0 | 0.1 | 0.2 | 0 | 0.1 | 0.2 |
| NCO content (%) | 6.68 | 6.72 | 6.7 | 8.91 | 8.91 | 8.91 | 9 | 9 | 9.02 |
| Shore A hardness | 83 | 80 | 83 | 90 | 90 | 90 | 92 | 93 | 91 |
| Elongation (%) | 540 | 530 | 565 | 480 | 430 | 470 | 495 | 490 | 480 |
| Elongation set (%) | 12 | 12 | 12 | 10 | 20 | 15 | 25 | 20 | 20 |
| Tensile str. (MPa) | 40.8 | 39.3 | 44.1 | 45.9 | 51.0 | 41.4 | 51.0 | 48.8 | 53.0 |
| Modulus (MPa) | | | | | | | | | |
| 100% | 3.9 | 3.7 | 3.9 | 6.3 | 7.0 | 6.6 | 7.7 | 7.8 | 8.0 |
| 300% | 10.0 | 9.6 | 9.9 | 14.7 | 15.0 | 14.5 | 14.7 | 15.6 | 16.7 |

What is claimed is:

1. A process for preparing solid elastomeric polyurethanes comprising reacting, in an open mold at an isocyanate index of about 80 to about 120, (a) an isocyanate prepolymer having an isocyanate content of about 3 to about 15% by weight and a number average molecular weight of about 550 to about 20,000, wherein said isocyanate prepolymer is a reaction product of (1) one or more organic polyisocyanates having 2 to 3 reactive isocyanate groups, and (2) one or more isocyanate-reactive polyester polyols having 2 to 3 isocyanate-reactive hydroxyl groups and a number average molecular weight of 400 to 10,000 and prepared in the presence of an esterification catalyst, optionally in admixture with up to an equal weight of one or more isocyanate-reactive compounds other than said polyester polyols and having a functionality of 2 to 3 and a number average molecular weight of 400 to 10,000, wherein the equivalent ratio of isocyanate groups of component (a)(1) to isocyanate-reactive groups of component (a)(2) is from about 1.2:1 to about 34:1;

(b) a diol chain extender having a molecular weight of 62 to 399, optionally in admixture with up to about an equal weight of a crosslinker having 3 to 6 hydroxyl groups and a molecular weight of 90 to 399 and up to an equal weight of an amino-containing chain extender and/or crosslinker having a molecular weight of from 32 to 399;

(c) 0.001 to 10% by weight, based on the weight of the isocyanate prepolymer, of a catalyst; and (d) 0.01 to 5% by weight, based on the isocyanate prepolymer, of one or more surface skinning retardants selected from the group consisting of (1) carboxylic acids and derivatives thereof selected from the group consisting of (i) aliphatic mono- and dicarboxylic acids and hydroxy-substituted derivatives thereof and (ii) aromatic monocarboxylic acids and hydroxy-substituted derivatives and acid halides thereof, (2) 1,2-diketones, 1,3-diketones, and benzoins;

(3) mono- and dihydric phenols, (4) ureas and thioureas selected from the group consisting of N-methylurea, N,N'-dimethylurea, 1,1,3,3-tetramethylurea, N,N'-dimethylcarbanilide, thiourea, 1,3-dibutylthiourea, and 1,3-diphenyl-2-thiourea, (5) phosphorus compounds selected from the group consisting of phosphite mono, di-, and triesters, phosphonate esters, and aromatic phosphinic acids and esters thereof, and (6) mixtures thereof.

2. A process according to claim 1 wherein organic polyisocyanate (a)(1) is diphenylmethane-2,4'- and/or -4,4'-diisocyanate.

3. A process according to claim 1 wherein isocyanate-reactive polyester polyol (a)(2) is a polyethylene adipate, a polybutylene adipate, or a polyethylene/butylene adipate.

4. A process according to claim 1 wherein isocyanate prepolymer (a) has an isocyanate content of 4 to 10% by weight.

5. A process according to claim 1 wherein isocyanate prepolymer (a) has a number average molecular weight of 800 to 5000.

6. A process according to claim 1 wherein the equivalent ratio of isocyanate groups of component (a)(1) to isocyanate-reactive groups of component (a)(2) is from 1.7:1 to 5:1.

7. A process according to claim 1 wherein diol chain extender (b) has a molecular weight of 62 to 120.

8. A process according to claim 1 wherein catalyst (c) is an organic tin, bismuth, titanium, or zinc compound.

9. A process according to claim 1 wherein 0.001 to 1% by weight, based on the weight of the isocyanate prepolymer, of a catalyst is used.

10. A process according to claim 1 wherein the surface skinning retardant is stearic acid, adipic acid, tartaric acid, benzoic acid, salicylic acid, p-hydroxybenzoic acid, benzoyl chloride, p-nitrobenzoyl chloride, 2,3-butanedione, benzil, benzoin, 2,4-pentanedione, dibenzoylmethane, 2,6-di-tert-butyl-p-cresol, 8-hydroxyquinoline, t-butyl catechol, thiourea, 1,3-dibutylthiourea, 1,3-diphenyl-2-thiourea, N-methylurea, N,N'-dimethylurea, 1,1,3,3-tetramethylurea, N,N'-dimethylcarbanilide, diethyl phosphite, trimethyl phosphite, dimethyl methylphosphonate, or phenylphosphinic acid.

11. A process according to claim 1 wherein 0.05 to 0.5% by weight, based on the isocyanate prepolymer, of a surface skinning retardant is used.

12. A solid elastomeric polyurethane prepared by the process of claim 1.

* * * * *